United States Patent
Saheki

(10) Patent No.: US 6,708,558 B2
(45) Date of Patent: Mar. 23, 2004

(54) TRANSMITTER FOR MONITORING THE CONDITION OF A TIRE

(75) Inventor: Setsuhiro Saheki, Ogaki (JP)

(73) Assignee: Pacific Industrial Co., Ltd., Ogaki (JP)

( * ) Notice: Subject to any disclaimer, the term of this patent is extended or adjusted under 35 U.S.C. 154(b) by 0 days.

(21) Appl. No.: 10/159,082

(22) Filed: May 29, 2002

(65) Prior Publication Data

US 2003/0110850 A1 Jun. 19, 2003

(30) Foreign Application Priority Data

Dec. 17, 2001 (JP) ......................................... 2001-383460

(51) Int. Cl.⁷ ............................................. B60C 23/02
(52) U.S. Cl. ....................................................... 73/146.5
(58) Field of Search ........................... 73/146.2, 146.3, 73/146.5, 146.8, 146, 715–727, 753, 756; 301/65, 95, 96, 97, 98, 37.37; 152/381.5, 381.6; 340/442–447

(56) References Cited

U.S. PATENT DOCUMENTS 5,731,516 A * 3/1998 Handfield et al. .......... 73/146.5
5,844,131 A   12/1998 Gabelmann et al.
6,357,833 B1 * 3/2002 Bajer .................... 301/95.101

* cited by examiner

Primary Examiner—William Oen
(74) Attorney, Agent, or Firm—Crompton, Seager & Tufte, LLC

(57) ABSTRACT

A tire condition monitoring apparatus monitors the condition of a tire of a vehicle. A transmitter of the apparatus includes an installed portion, a casing, and arms. A tire condition detecting element is installed in the installed portion. The casing accommodates the installed portion. The installed portion is connected to the casing by the arms. The arms tolerate reactive force and protect the installed portion from that reactive force.

20 Claims, 3 Drawing Sheets

TRANSMITTER FOR MONITORING THE CONDITION OF A TIRE

BACKGROUND OF THE INVENTION

The present invention relates to transmitters of tire condition monitoring apparatuses, and, more particularly, to transmitters attached to wheels, to which tires are connected, for transmitting data indicating the condition of the tires, such as air pressure, to a receiver installed in a vehicle.

A wireless tire condition monitoring apparatus has been proposed to enable a driver to monitor the condition of a tire of a vehicle in a passenger compartment.

With reference to FIG. 4, the tire condition monitoring apparatus includes a transmitter 50 for transmitting data indicating the air pressure of the tire to a receiver (not illustrated), which is installed in the vehicle. The transmitter 50 has a square box-like casing 51 and a valve stem 52, which is formed integrally with the casing 51. The casing 51 accommodates an electronic board 53 and a battery 54. A communication hole (not illustrated) is formed in the casing 51.

The electronic board 53 is substantially square. Two bosses 55, 56, which are integrally formed with the casing 51, fix the electronic board 53. The bosses 55, 56 are located at diagonal positions in the electronic board 53. The electronic board 53 is provided with circuit elements 57, such as a pressure detecting element and various signal processing elements. A battery 54 is connected to the electronic board 53 for supplying power to the circuit elements 57.

With reference to FIG. 5, the casing 51 of the transmitter 50 is fitted into a valve hole 63 of a wheel 62 such that the casing 51 is located in the interior of a tire 61. A valve stem 52 introduces air to the interior of the tire 61 through a communication hole. The valve stem 52 also functions as an antenna that transmits the data indicating the air pressure of the tire 61.

The casing 51 is formed of resin to reduce the weight of the transmitter 50. When the vehicle is moving, centrifugal force acts on the transmitter 50, which is attached to the wheel 62. The centrifugal force is generated in relation to the outer diameter of the wheel 62, the outer diameter of the tire 61, and the traveling speed of the vehicle. For example, the centrifugal force is approximately 1,500 G when the vehicle traveling speed is 300 km/h. The centrifugal force deforms the casing 51 such that the positions of the bosses 55, 56 relative to each other are changed. This generates force, which acts on the electronic board 53. The electronic board 53 is also affected by the centrifugal force, which is caused by the movement of the vehicle. The electronic board 53 is thus deformed by these forces. This applies excessive force to the circuit elements 57, thus damaging the circuit elements 57.

The valve hole 63 of the wheel 62 is formed such that the valve hole 63 is inclined with respect to the rotational axis of the wheel 62 at a predetermined angular range (17.5 to 20.0 degrees). Also, the position of the valve hole 63 may be varied among products. Thus, the inclination angle of the valve stem 52 with respect to the casing 51 needs to be selected such that the casing 51 does not contact a drop center portion 62a of the wheel 62 when the transmitter 50 is attached to the wheel 62.

If the inclination angle of the valve hole 63 with respect to the rotational axis of the wheel 62 is relatively large, the casing 51 is spaced from the drop center portion 62a of the wheel 62 at a relatively large interval when the transmitter 50 is attached to the wheel 62. Thus, if a bead portion 61a of the tire 61 contacts the casing 51 when the tire 61 is being attached or detached from the wheel 62, force acts on the casing 51 to urge the casing 51 toward the drop center portion 62a of the wheel 62. With reference to FIGS. 6(a) and 6(b), the force deforms the casing 51, as indicated by the broken lines. This deforms the electronic board 53 and thus damages the circuit elements 57.

SUMMARY OF THE INVENTION

Accordingly, it is an objective of the present invention to provide a transmitter of a tire condition monitoring apparatus that prevents a circuit element from being damaged.

To achieve the foregoing and other objectives and in accordance with the purpose of the present invention, the invention provides a transmitter of an apparatus for monitoring the condition of a tire of a vehicle. The transmitter includes an installed portion, a casing, and an arm. An element for detecting the condition of the tire is installed in the installed portion. The casing accommodates the installed portion. The installed portion is connected to the casing by the arm. The arm tolerates reactive force acting on the casing and protects the installed portion from that reactive force.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objectives and advantages thereof, may best be understood by reference to the following description of the presently preferred embodiments together with the accompanying drawings in which.

DETAILED DESCRIPTION OF THE PREFERRED EMBODIMENTS

An embodiment of the present invention will now be described with reference to FIGS. 1 to 3(b).

Figure 1:
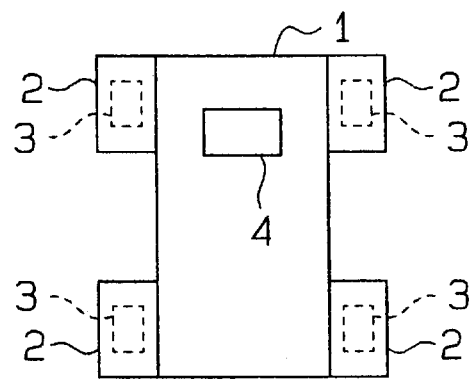
FIG. 1 is a view schematically showing a tire condition monitoring apparatus according to an embodiment of the present invention.

With reference to FIG. 1, a tire condition monitoring apparatus has four transmitters 3, each one of which is installed in a different one of four tires 2 of a vehicle 1, and a receiver 4. The receiver 4 is installed in the body frame of the vehicle 1. Each of the transmitters 3 measures parameters indicating the condition of the associated tire 2, such as the air pressure of the tire 2 and the temperature of the interior of the tire 2. The transmitters 3 then wirelessly transmit data indicating the measurement to the receiver 4.

Based on the data received from the transmitters 3, the receiver 4 enables an indicator (not illustrated), which is installed in the passenger compartment, to indicate the information regarding the air pressure and the temperature of the tires 2.

Figure 2:
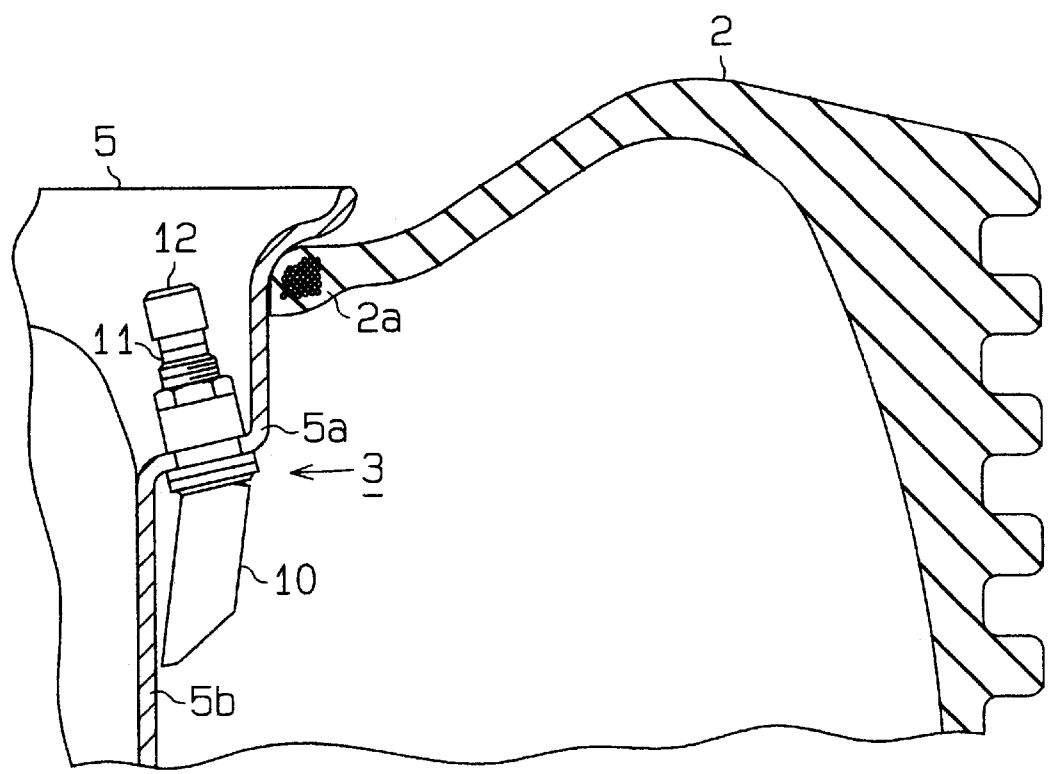
FIG. 2 is a cross-sectional view showing a transmitter installed in the apparatus of FIG. 1 in a state attached to a wheel.

With reference to FIG. 2, each tire 2 is attached to a wheel 5. Each transmitter 3 includes a main body 10, which is located in the interior of the associated tire 2, and a valve stem 11. In each transmitter 3, the valve stem 11 projects from the main body 10 to the exterior through a rim 5a of the associated wheel 5. The valve stem 11 is formed of conductive material, or, preferably, metal material. The valve stem 11 introduces air to the interior of the tire 2. A cap 12, which is formed of resin or metal, is detachably attached to the distal end of the valve stem 11.

Figure 3A:
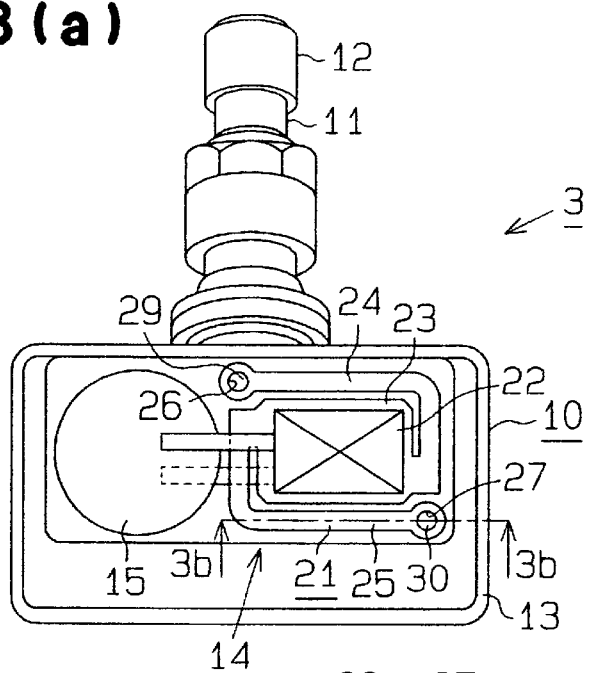
FIG. 3(a) is a view explaining the structure of the transmitter illustrated in FIG. 2.
Figure 3B:
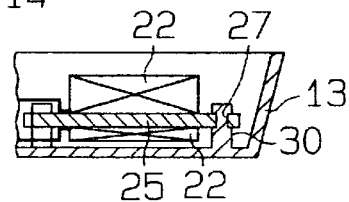
FIG. 3(b) is a cross-sectional view taken along line 3b—3b of FIG. 3(a)
Figure 4:
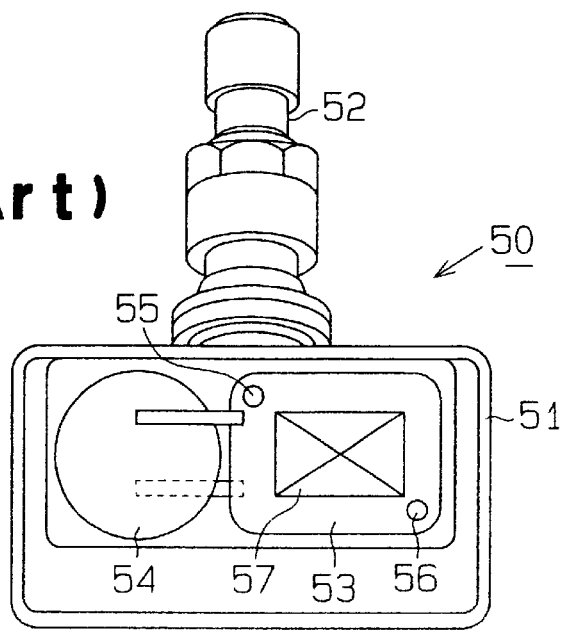
FIG. 4 is a view explaining the structure of a prior art transmitter.
Figure 5:
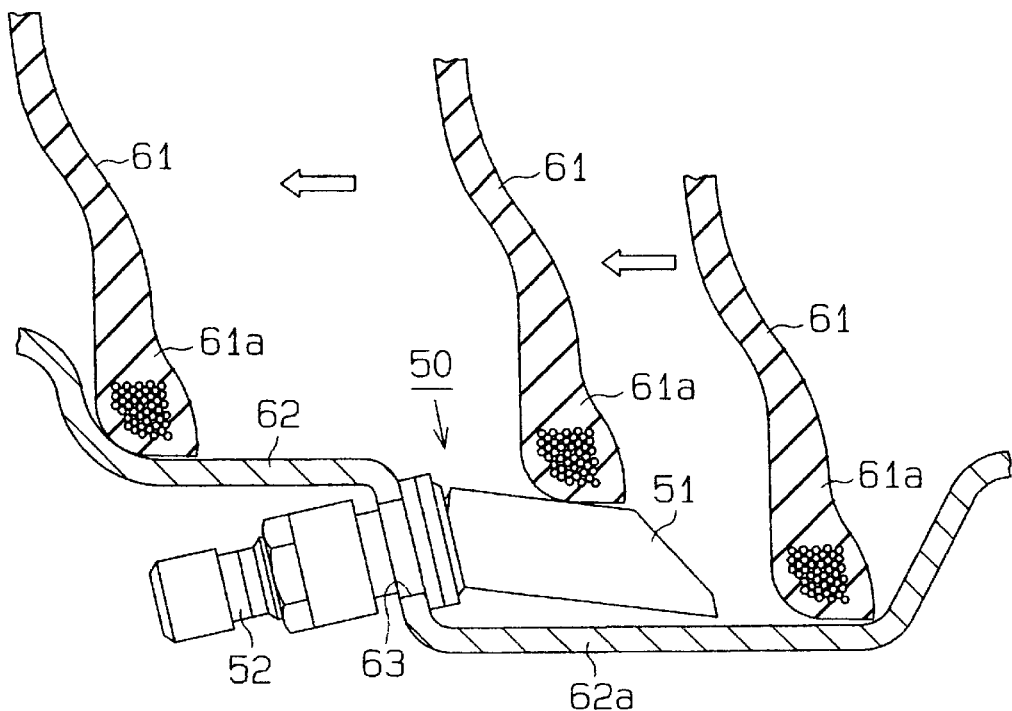
FIG. 5 is a view explaining attachment of a tire to a wheel in which the transmitter of FIG. 4 is installed.
Figure 6A:
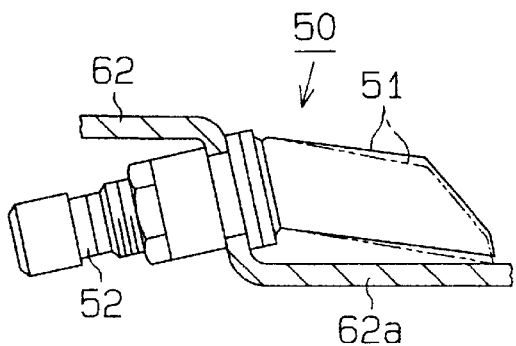
FIGS. 6(a) and 6(b) are views each explaining deformation of a casing of the transmitter of FIG. 4.
Figure 6B:
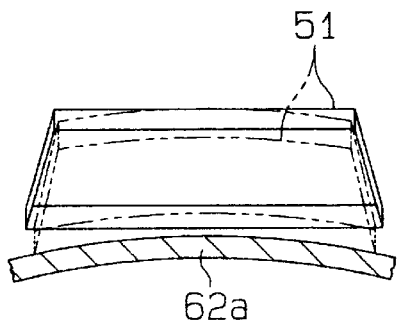

With reference to FIG. 3(a), the main body 10 includes a square box-like, resin casing 13. The casing 13 accommodates a signal processing unit 14 and a battery 15. The opening of the casing 13 is closed by a lid (not illustrated).

The signal processing unit 14 includes an electronic board 21 and a plurality of circuit elements 22, which is installed in the electronic board 21. The circuit elements 22 include a pressure detecting portion. The circuit elements 22 acknowledge the condition of the associated tire 2, such as the air pressure of the tire 2. For convenience of understanding, the circuit elements 22 are illustrated as a single component in the drawings.

The electronic board 21 includes a substantially square installed portion 23 and a pair of arms 24, 25. The circuit elements 22 are installed in the installed portion 23. In this embodiment, with reference to FIG. 3(b), the circuit elements 22 are installed at opposite sides of the installed portion 23.

The arms 24, 25 are located at positions to form mirror images with respect to each other. In this embodiment, the arms 24, 25 are connected to two opposite sides of the installed portion 23 (as viewed to the right and the left in FIG. 3(a)). Further, each of the arms 24, 25 is formed integrally with the installed portion 23 and has a substantially L shape such that the installed portion 23 is surrounded by the arms 24, 25. The distal end of each arm 24, 25 have a disk-like shape. Two attachment holes 26, 27 are formed respectively in the distal ends of the arms 24, 25.

The arms 24, 25 tolerate various reactive forces that act on the electronic board 21 as a whole (centrifugal force, tensile force, and compressive force) and protect the installed portion from that reactive force. Further, the arms 24, 25 are elastically deformable.

Two bosses 29, 30 are formed integrally with the casing 13. The bosses 29, 30 are fitted into the attachment holes 26, 27, respectively. In this state, the distal ends of the bosses 29, 30 are, for example, thermally deformed to a rivet-like shape. This fixes the electronic board 21 of the signal processing unit 14 to the casing 13.

Although not illustrated, the circuit elements 22 are protected by a coating or potting of soft elastic material.

An electrode of the battery 15 is connected to the installed portion 23 such that the movement of the arms 24, 25 is not hampered. The battery 15 thus supplies power to the circuit elements 22.

Although not illustrated, the signal processing unit 14 is electrically connected to the valve stem 11. The signal processing unit 14 wirelessly transmits data indicating the condition of the associated tire 2 by the valve stem 11. That is, the valve stem 11 also functions as a transmitting antenna.

The illustrated embodiment has the following effects.

(1) The electronic board 21 includes the arms 24, 25. The arms 24, 25 fix the installed portion 23, in which the circuit elements 22 are installed, to the casing 13. The arms 24, 25 tolerate the various forces that act on the electronic board 23 as a whole (centrifugal force, tensile force, and compressive force). Thus, the centrifugal force caused by the movement of the vehicle is absorbed by deformation of the arms 24, 25 to prevent the casing 13 from being deformed. The installed portion 23 thus does not become deformed. Accordingly, the circuit elements 22, which are installed in the installed portion 23, are prevented from being deformed or receiving excessive force. This protects the circuit elements 22 from damages.

(2) When a bead portion 2a of each tire 2 moves near the casing 13 of the transmitter 3 during attachment or detachment of the tire 2, the casing 13 is deformed to contact a drop center portion 5b of the wheel 5. However, the deformation of the casing 13 is absorbed by the arms 24, 25 to prevent the installed portion 23 from being deformed. This prevents the circuit elements 22, which are installed in the installed portion 23, from being damaged.

(3) The arms 24, 25 are located at positions to form mirror images with respect to the axis of the circuit elements 22. The installed portion 23 is thus held in an optimally balanced state.

(4) The arms 24, 25 are formed integrally with the installed portion 23. This reduces the number of the components of each transmitter 3 and the number of the steps required for fabricating the transmitter 3.

(5) The arms 24, 25 each have a substantially L shape. This minimizes the size of electronic board 21 as a whole such that the transmitter 3 becomes compact.

(6) When installing the electronic board 21, the bosses 29, 30, which are formed integrally with the casing 13, are fitted into the attachment holes 26, 27, respectively. The distal portions of the bosses 29, 30 are then each deformed to a rivet-like shape. The electronic board 21 is thus easily installed, without using any particular attachment components, such as springs. The transmitters 3 thus become relatively light.

It should be apparent to those skilled in the art that the present invention may be embodied in many other specific forms without departing from the spirit or scope of the invention. Particularly, it should be understood that the invention may be embodied in the following forms.

A temperature sensor may be installed in each of the transmitters 3. In this case, each transmitter wirelessly transmits data indicating the air pressure of the associated tire 2 and the temperature of the interior of the tire 2 as data indicating the condition of the tire 2.

The present invention does not necessarily have to be applied to a four-wheel vehicle but may be applied to a two-wheel vehicle, such as a bicycle and a motor bike, or a bus or a towed vehicle or an industrial vehicle with tires (for example, a forklift). If the present invention is applied to the towed vehicle, the receiver 40 and the indicator are installed in the towed vehicle.

The shapes of the arms 24, 25 are not restricted to those illustrated in the embodiment. Further, three or more arms may be formed in each electronic board 21.

The fixing of the electronic board 21 to the casing 13 does not necessarily have to be achieved by deforming the distal end of each boss 29, 30 to a rivet-like shape but may be achieved using, for example, springs.

The arms 24, 25 may be formed separately from the installed portion 23.

The present examples and embodiments are to be considered as illustrative and not restrictive and the invention is not to be limited to the details given herein, but may be modified within the scope and equivalence of the appended claims.

What is claimed is:

1. A transmitter for an apparatus for monitoring the condition of a tire on a wheel of a vehicle, the wheel including a valve hole, the transmitter comprising:

a signal processing unit including a circuit board having an installed portion;

an element for detecting the condition of the tire installed in the installed portion;

a casing that accommodates the installed portion;

a valve stem extending from the casing for projecting through the valve hole of the wheel for introducing air into the tire and attaching the casing to the wheel; and an arm, wherein the installed portion is connected to the casing by the arm, and the arm tolerates reactive force acting on the casing and protects the installed portion from that reactive force by the arm deforming to prevent the installed portion from deforming.

2. The transmitter according to claim 1, wherein the arm is formed integrally with the installed portion.

3. The transmitter according to claim 1, wherein the arm is one of two arms, and the arms are located at positions to form mirror images with respect to the installed portion.

4. The transmitter according to claim 1, wherein the arm has a substantially L shape.

5. The transmitter according to claim 1, wherein an attachment hole is formed in a distal end of the arm, a boss formed integrally with the casing is fitted in the attachment hole, and, in this state, a distal portion of the boss is deformed to a rivet-like shape.

6. A transmitter for an apparatus for monitoring the condition of a tire on a wheel of a vehicle, the wheel including a valve hole, the transmitter comprising:

a signal processing unit including a circuit board having an installed portion;

an element for detecting the condition of the tire installed in the installed portion;

a casing that accommodates the installed portion;

a valve stem extending from the casing for projecting through the valve hole of the wheel for introducing air into the tire and attaching the casing to the wheel; and an elastically deformable arm, where the arm projects from the installed portion and the installed portion is connected to the casing by the arm.

7. The transmitter according to claim 6, wherein the arm is one of two arms, and the arms are located at positions to form mirror images with respect to the installed portion.

8. The transmitter according to claim 6, wherein the arm has a substantially L shape.

9. The transmitter according to claim 6, wherein an attachment hole is formed in a distal end of the arm, a boss formed integrally with the casing is fitted in the attachment hole, and, in this state, a distal portion of the boss is deformed to a rivet-like shape.

10. A transmitter for an apparatus for monitoring the condition of a tire on a wheel of a vehicle, wherein the wheel includes a valve hole, the transmitter comprising:

a signal processing unit including a circuit board having an installed portion;

an element for detecting the condition of the tire installed in the installed portion;

a casing which accommodates the installed portion;

a valve stem extending from the casing for projecting through the valve hole of the wheel for introducing air into the tire; and a pair of arms connecting the installed portion to the casing, each arm having opposite ends, with only one end of each arm being connected to the installed portion and the other end of each arm being connected to the casing.

11. The transmitter of claim 10, wherein the installed portion includes opposite sides, and said only one end of each arm connects to opposite sides of the installed portion.

12. The transmitter of claim 11, wherein each opposite side of the installed portion has a width, and said only one end of each arm connects only along a portion of the width of each opposite side of the installed portion.

13. The transmitter according to claim 10, wherein said other end of each arm connects to the casing via a boss projecting from the casing.

14. The transmitter according to claim 11, wherein the arms are elastically deformable and tolerate reactive force acting on the casing and protects the installed portion from that reactive force by the arm deforming to prevent the installed portion from deforming.

15. The transmitter of claim 14, wherein the installed portion includes opposite sides, and said only one end of each arm connects to opposite sides of the installed portion.

16. The transmitter of claim 15, wherein each opposite side of the installed portion has a width, and said only one end of each arm connects only along a portion of the width of each opposite side of the installed portion.

17. The transmitter according to claim 14, wherein said other end of each arm connects to the casing via a boss projecting from the casing.

18. The transmitter of claim 17, wherein the installed portion includes opposite sides, and said only one end of each arm connects to opposite sides of the installed portion.

19. The transmitter of claim 18, wherein each opposite side of the installed portion has a width, and said only one end of each arm connects only along a portion of the width of each opposite side of the installed portion.

20. The transmitter according to claim 10, wherein each of the arms has a substantially L shape.

* * * * *